United States Patent [19]
Worley et al.

[11] Patent Number: 5,390,105
[45] Date of Patent: Feb. 14, 1995

[54] METHOD AND APPARATUS FOR CONTROLLING A DEVICE

[75] Inventors: Thomas J. Worley; Charles E. Neal, III; Donald E. Bailey; Vincent P. Rivera, all of Duncan, Okla.

[73] Assignee: Halliburton Company, Duncan, Okla.

[21] Appl. No.: 955,531

[22] Filed: Oct. 1, 1992

[51] Int. Cl.[6] ............................................. G06F 15/46
[52] U.S. Cl. ................................. 364/184; 198/301; 364/479
[58] Field of Search .............................. 364/184–187, 364/148–150, 152, 153, 154; 414/289, 293–296, 300–302; 198/300, 301, 523, 524

[56] References Cited

U.S. PATENT DOCUMENTS

| | | | |
|---|---|---|---|
| 3,452,774 | 7/1969 | Stanton | 137/101.19 |
| 4,053,747 | 10/1977 | Davis | 364/494 |
| 4,057,715 | 11/1977 | Jones et al. | 364/494 |
| 4,353,482 | 10/1982 | Tomlinson et al. | 222/1 |
| 4,751,648 | 6/1988 | Sears, III et al. | 364/422 |
| 4,779,186 | 10/1988 | Handke et al. | 364/172 |
| 4,916,631 | 4/1990 | Crain et al. | 364/502 |
| 5,010,473 | 4/1991 | Jacobs | 364/150 |

OTHER PUBLICATIONS

Halliburton Services general technical data brochure on the Automatic Proppant Control System (number G-9156 (Rev.)) publsihed in the United States more than one year ago; Date Unknown.

*Primary Examiner*—Joseph Ruggiero
*Assistant Examiner*—Cameron H. Tousi
*Attorney, Agent, or Firm*—Stephen R. Christian; E. Harrison Gilbert, III

[57] ABSTRACT

A method of controlling an apparatus with a control signal responsive to a feedback signal comprises: detecting when a feedback signal is not being received; determining whether a control signal is being provided; and adjusting the control to the apparatus depending on whether the control signal is being provided. An apparatus for performing this method comprises a programmed computer and a control signal feedback circuit for providing to the programmed computer a signal indicating whether a valid control signal is being provided.

6 Claims, 5 Drawing Sheets

METHOD AND APPARATUS FOR CONTROLLING A DEVICE

BACKGROUND OF THE INVENTION

This invention relates generally to methods and apparatus for controlling a device with a control signal responsive to a feedback signal. In a particular aspect, the invention relates more particularly to a method and apparatus for controlling a screw conveyor that moves proppant into a tub for mixing into a fracturing fluid used to fracture an oil or gas well.

Various devices are controlled in closed loop control systems wherein a controller (1) generates a control signal for trying to cause the device to operate so that a previously defined set point condition is reached and (2) receives a feedback signal in response to which the controller varies the control signal as needed until the set point condition is met or changed. Such a control system may work well until the controller fails to receive the feedback signal, at which time the controller does not know what the controlled device is doing in response to the generated control signal.

One system we are aware of does not recognize a no feedback signal condition as such. Instead it assumes a zero feedback signal, which causes the controller to generate a maximum control signal. This can result in the device being overdriven into a runaway condition. When the system is trying to control amounts of materials being mixed together, for example, such a condition can result in a mixture having the wrong amounts of constituents.

To overcome this shortcoming, there is the need for a method and apparatus for controlling a device with a control signal responsive to a feedback signal so that intelligent responses can be automatically provided when a feedback signal is lost. Such a method and apparatus should be able to determine whether manual control of the apparatus should be implemented or whether continued, but modified, automatic control should be maintained. If the latter, the method and apparatus should also be capable of determining how to make the necessary adjustment automatically.

SUMMARY OF THE INVENTION

The present invention overcomes the above-noted and other shortcomings of the prior art by providing a novel and improved method and apparatus for controlling a device with a control signal responsive to a feedback signal. The present invention detects not only a failure to receive a feedback signal, but also whether a control signal is being provided. The present invention can determine when manual control of the apparatus should be assumed and when automatic control can continue ("apparatus" and "device" may be interchangeably used herein and in the claims as to the thing controlled, and neither is to be taken as limiting the present invention). If automatic control continues, it does so in response to predetermined control signal-feedback signal relationships and a desired set point.

The present invention provides a method of controlling an apparatus with a control signal responsive to a feedback signal, comprising: detecting when a feedback signal is not being received; determining whether a control signal is being provided; and adjusting the control to the apparatus depending on whether the control signal is being provided.

In the preferred embodiment, adjusting the control to the apparatus includes manually controlling the apparatus in response to determining no control signal is being provided and providing automatic open loop control to the apparatus in response to determining the control signal is being provided. Providing automatic open loop control includes generating a fault-condition control signal in response to a desired set point for operating the apparatus and to predetermined control signal-feedback signal relationships. The predetermined relationships are derived in the preferred embodiment by running a diagnostic program in a computer connected for controlling the apparatus and for storing data for later identifying respective test feedback signals with predetermined test control signals.

In a specific aspect, the present invention provides a method of controlling an apparatus for delivering proppant to a mixing tub, which apparatus includes a proportional valve controlling a pump driving a motor moving a proppant delivery mechanism, which proportional valve is responsive to a control signal from a computer and which computer is responsive at least in part to a feedback signal from a sensor detecting a speed associated with the driving of the motor by the pump. This method comprises: (a) detecting when the computer is not receiving a feedback signal from the sensor; (b) in response to step (a), determining whether a control signal is being provided to the proportional valve; (c) in response to determining that no control signal is being provided to the proportional valve, providing an indication so that an operator can know that no control signal is being provided; and (d) in response to determining that the control signal is being provided to the proportional valve, generating a fault-condition control signal in response to a predetermined data base in the computer. This particular method preferably further comprises, prior to step (a), defining the predetermined data base in the computer, including determining test feedback signals generated by the sensor in response to test control signals provided by the computer to the proportional valve.

The present invention also provides an apparatus for controlling a device providing an output that is monitored through a sensor providing a feedback signal. This apparatus comprises: means for generating a control signal for the device in response to a set point and the feedback signal; means for detecting whether the feedback signal is being provided; means for determining whether the control signal is being provided to the device; and means, responsive to the detecting means detecting that no feedback signal is being provided, for adjusting the control to the device depending on whether the control signal is being provided. The apparatus preferably further comprises means for detecting test feedback signals in response to test control signals, and the means for adjusting preferably includes means for generating a fault-condition control signal corresponding to the test control signal for one of the test feedback signals selected in response to the set point. These are preferably implemented in a programmed computer and with control signal feedback means for providing to the programmed computer a signal indicating whether a valid control signal is being provided.

Therefore, from the foregoing, it is a general object of the present invention to provide a novel and improved method and apparatus for controlling a device with a control signal responsive to a feedback signal. Other and further objects, features and advantages of

DETAILED DESCRIPTION OF PREFERRED EMBODIMENT

The present invention will be described with reference to the Automatic Proppant Control System (APCS) from Halliburton Services. See U.S. Pat. No. 4,916,631 to Crain et al., U.S. Pat. No. 4,779,186 to Handke et al., and U.S. Pat. No. 4,751,648 to Sears et al., all of which are incorporated herein by reference. A brief simplified description of the system will be given herein with reference to FIGS. 1 and 2.

Figure 1:
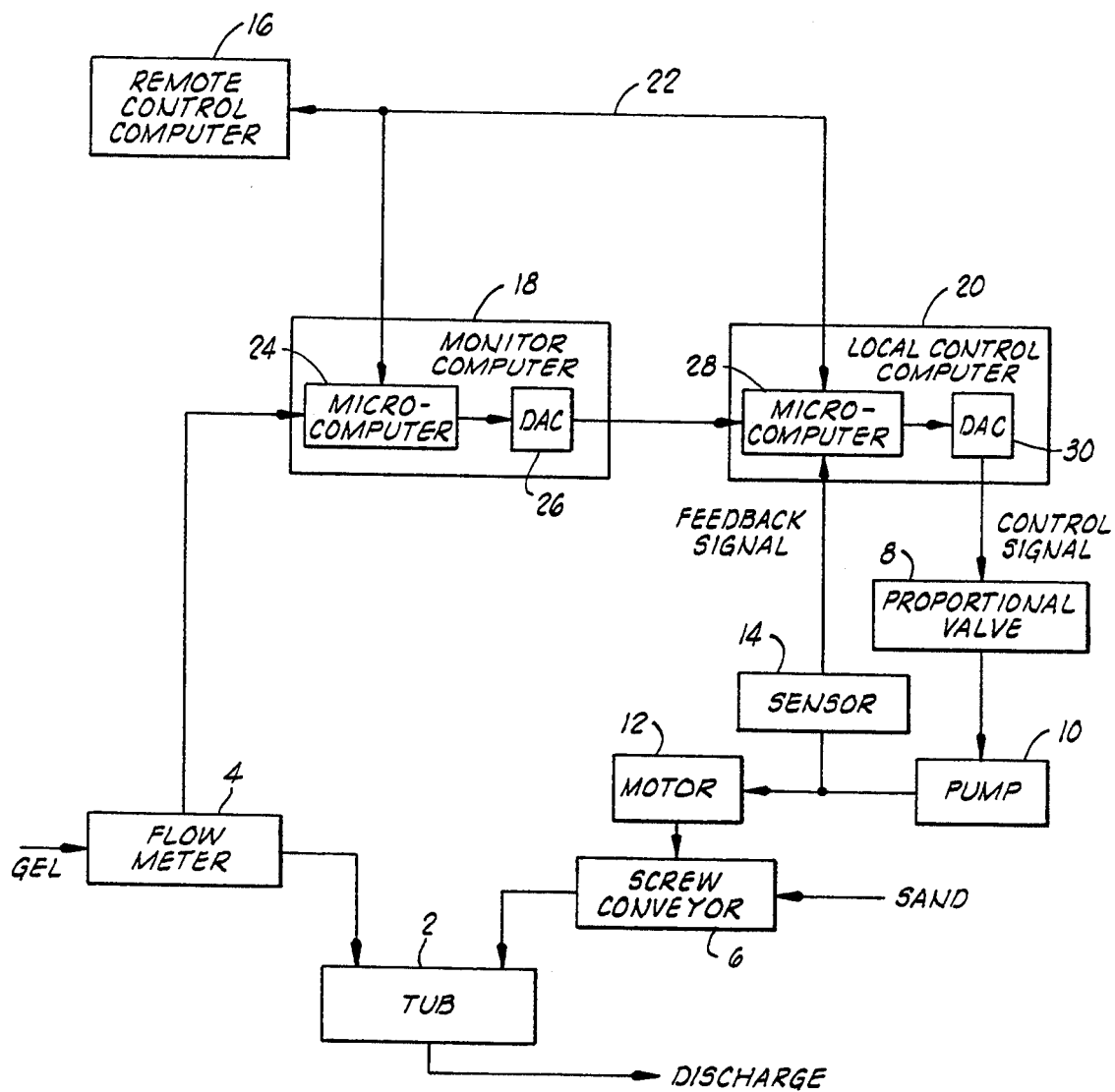
FIG. 1 is a block diagram of a prior art mixing system in which the preferred embodiment of the present invention is particularly adapted to be used.

The Automatic Proppant Control System provides a blender system used at an oil or gas well site to produce a fracturing fluid to be pumped into the well. Referring to FIG. 1, the blender system broadly includes a mixing container or tub 2 into which a base or primary fluid (e.g., a gel) is pumped or otherwise flowed from a fluid delivery subsystem. A flow meter 4 provides an electrical signal representing the flow rate of the clean (i.e., unblended) fluid as it flows into the mixing container 2. Added to the fluid in the mixing container 2 is a proppant, such as a sand of a type as known in the art, moved from a proppant delivery mechanism, such as a screw conveyor 6.

Associated with the sand screw conveyor 6 is screw drive equipment including a proportional valve 8, a pump 10 controlled by the setting of the valve 8, and a motor 12 that is driven by the pump 10 to move the screw of the conveyor 6. Also associated with the conveyor 6 is a transducer or sensor 14 which provides an electrical signal representative of the speed of the screw conveyor 6. As represented in FIG. 1, the sensor 14 specifically senses the rotational speed of the coupling between the pump 10 and the motor 12.

Another component of the blender system, but not shown in the drawings, is a densimeter of a suitable type known in the art for monitoring the density of the slurry pumped or discharged out of the mixing container 2 by any suitable means known in the art.

A remote control computer 16, a monitor computer 18, and a local control computer 20 control the blending operation. A local area network cable 22 connects the remote control computer 16 to the monitor computer 18 and the local control computer 20.

The monitor computer 18 includes a microcomputer 24 and a digital-to-analog (D/A) converter 26. The microcomputer 24 receives as an input signal the electrical signal from the flow meter 4. The microcomputer 24 also receives information from and transmits information to the remote control computer 16 over the cable 22. The microcomputer 24 provides a digital output to the D/A converter 26 which in turn provides a corresponding analog output to the local control computer 20.

The local control computer 20 includes a microcomputer 28 and a digital-to-analog converter 30. The microcomputer 28 receives the signal from the D/A converter 26 of the monitor computer 18, and the microcomputer 28 also receives a feedback signal from the sensor 14. The microcomputer 28 communicates with the remote control computer 16 through the cable 22 so that the microcomputer 28 receives one or more desired sand concentration set points from the remote control computer 16 in the illustrated application.

The local control computer 20 includes means for receiving feedback information from a controlled characteristic of the process. In the illustrated embodiment, this means is provided by the microcomputer 28 receiving the electrical feedback signal from the sensor 14. The local control computer 20 also includes means for generating a control signal to control the controlled characteristic of the process. This is accomplished by the microcomputer 28 and its associated D/A converter 30 providing an electrical signal to the proportional valve 8. In the preferred embodiment and under normal operating conditions, the control signal is provided in response to the feedback information, the control information from the remote control computer 16, and the real time information from the monitor computer 18.

To set up a proppant delivery program to be implemented in the blender system, the following information would be entered into the remote control computer 16: mode (e.g., ramp or step type changes in the concentration), pounds of proppant, type of proppant, gallons of fluid, type of fluid, the correction factor for the fluid, minimum and maximum rates for the sand screw conveyor, the expected job rate, and correction factors for the sand screw. Based on these inputs, the remote control computer 16 computes one or more set points and passes them over the cable 22 to the microcomputer 28 of the local control computer 20. Using a respective set point, the local control computer 20 will control the sand screw conveyor 6. During this control, the local control computer 20 maintains information about the current delivery rate of the sand screw 6 and the total quantity of proppant delivered.

In actual implementation, more than one sand screw conveyor and more than one monitor computer and local control computer can be used. Non-limiting examples of specific equipment to implement the monitor computer 18 and the local control computer 20 include the UNIPRO and UNIPRO II controllers from Halliburton Services.

Figure 2:
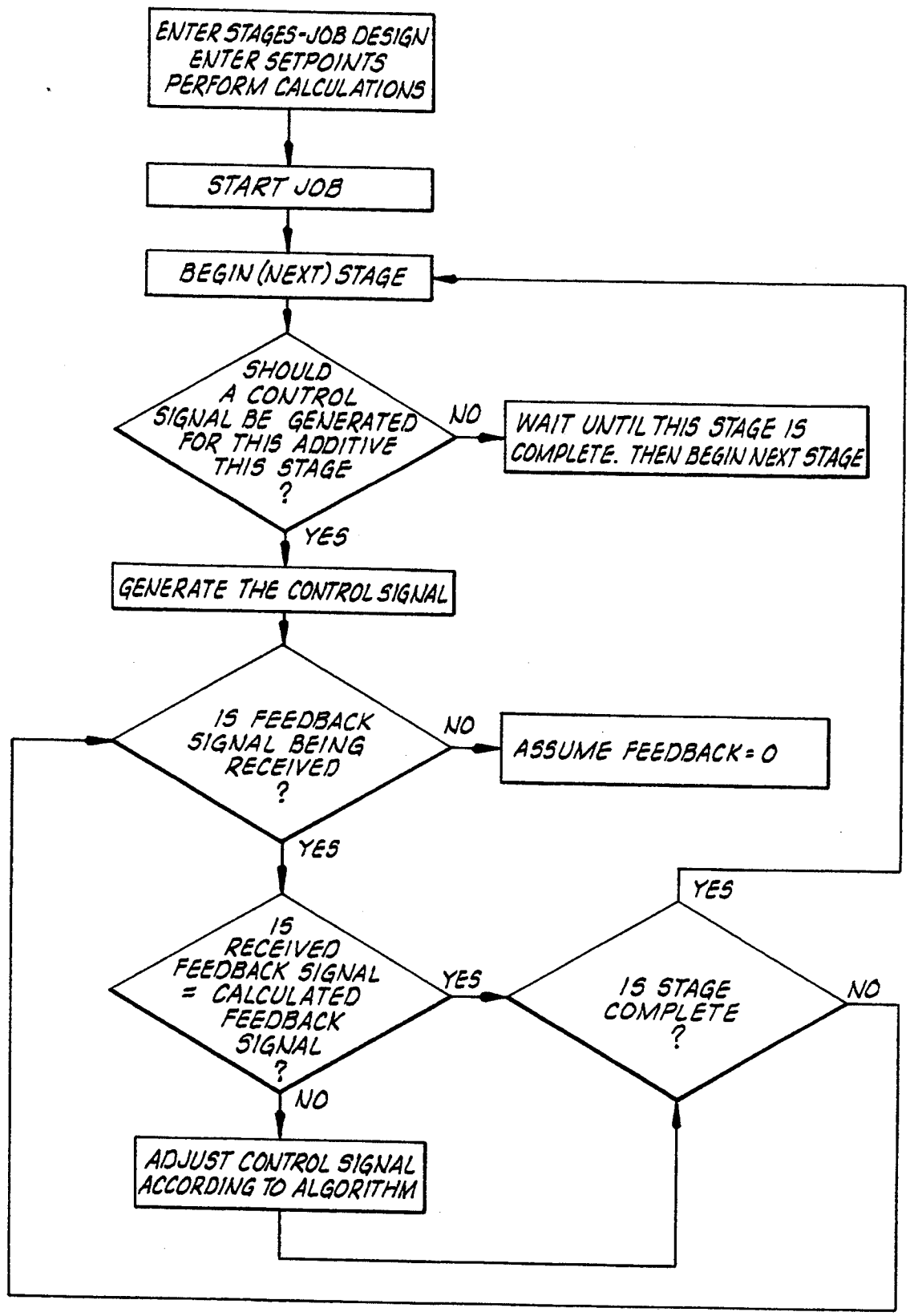
FIG. 2 is a flow chart for a computer program for the prior art system shown in FIG. 1.

Referring to FIG. 2, a part of the method performed in the system depicted in FIG. 1 that is particularly relevant to the present invention will be described. When a control signal for the proportional valve 8 is to be generated, this is done in the local control computer 20 as previously mentioned. This is shown in FIG. 2 by the "generate the control signal" step. Once the control signal has been generated, the local control computer 20 detects whether the feedback signal from the sensor 14 is being received. If it is, normal control proceeds by determining whether the actual received feedback signal indicates operation of the screw conveyor 6 at the desired set point. If not, an adjustment is made in accordance with predetermined programming not relevant to the present invention.

What is relevant to the present invention is to note in FIG. 2 that if the local control computer 20 detects no feedback signal being received, in the prior system the computer 20 assumed a zero (i.e., minimum screw conveyor output level) feedback signal. In response to this, the local control computer 20 would output a maximum control signal to drive the screw conveyor 6 to its maximum speed. This could result in a runaway condition wherein too much proppant would be input into the mixing tub 2. Overcoming this shortcoming is an object of the present invention, which includes a modification to the system shown in FIG. 1 and to the methodology depicted in FIG. 2. The present invention will now be described with reference to FIGS. 3–5.

Figure 3:
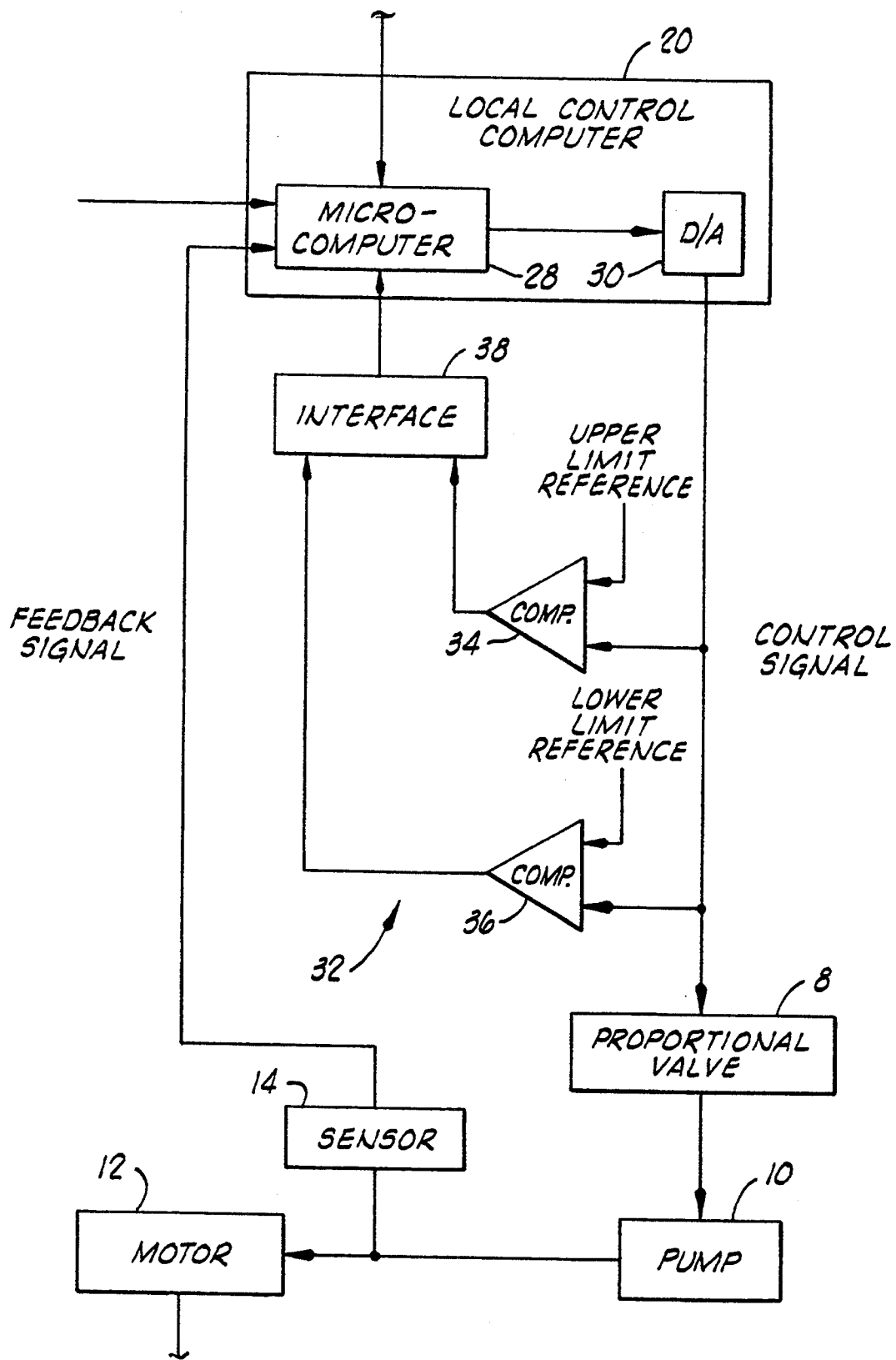
FIG. 3 is a block diagram of a portion of the prior art system as modified to implement the present invention.

The preferred embodiment of the present invention is adapted for use in the system shown in FIG. 1. A portion of this system, as modified in accordance with the present invention, is shown in FIG. 3. The illustrated portion includes the proportional valve 8 whose setting controls the pump 10 that drives the motor 12 for moving the proppant delivery mechanism embodied by the screw conveyor 6. As previously explained, the proportional valve 8 is responsive to the electrical control signal from the local control computer 20, which computer 20 is responsive at least in part to the electrical feedback signal from the sensor 14 detecting a speed associated with the driving of the motor 12 by the pump 10 (and thus representative of the screw conveyor delivery rate). This portion of the prior system is modified by the present invention to include control signal feedback means 32 (FIG. 3) and further to include modified programming in the microcomputer 28 of the local control computer 20 (FIGS. 4 and 5).

The control signal feedback means 32 represented in FIG. 3 provides to the modified programmed computer 20 an electrical signal indicating whether a valid control signal is being provided to the proportional valve 8. The control signal feedback means 32 includes a comparator 34 for comparing the control signal to an upper limit reference signal and a comparator 36 for comparing the control signal to a lower limit reference signal. In a specific embodiment, the upper limit reference signal is +10 VDC and the lower limit reference signal is +1 VDC. Any control signal outside this range is considered to be an invalid, or no, control signal (conversely, any control signal within this range is considered to be a valid control signal). If needed, an interface 38 for making the outputs of the comparators 34, 36 compatible with the input port of the microcomputer 28 can be used. These devices are of types known in the art.

Figure 4:
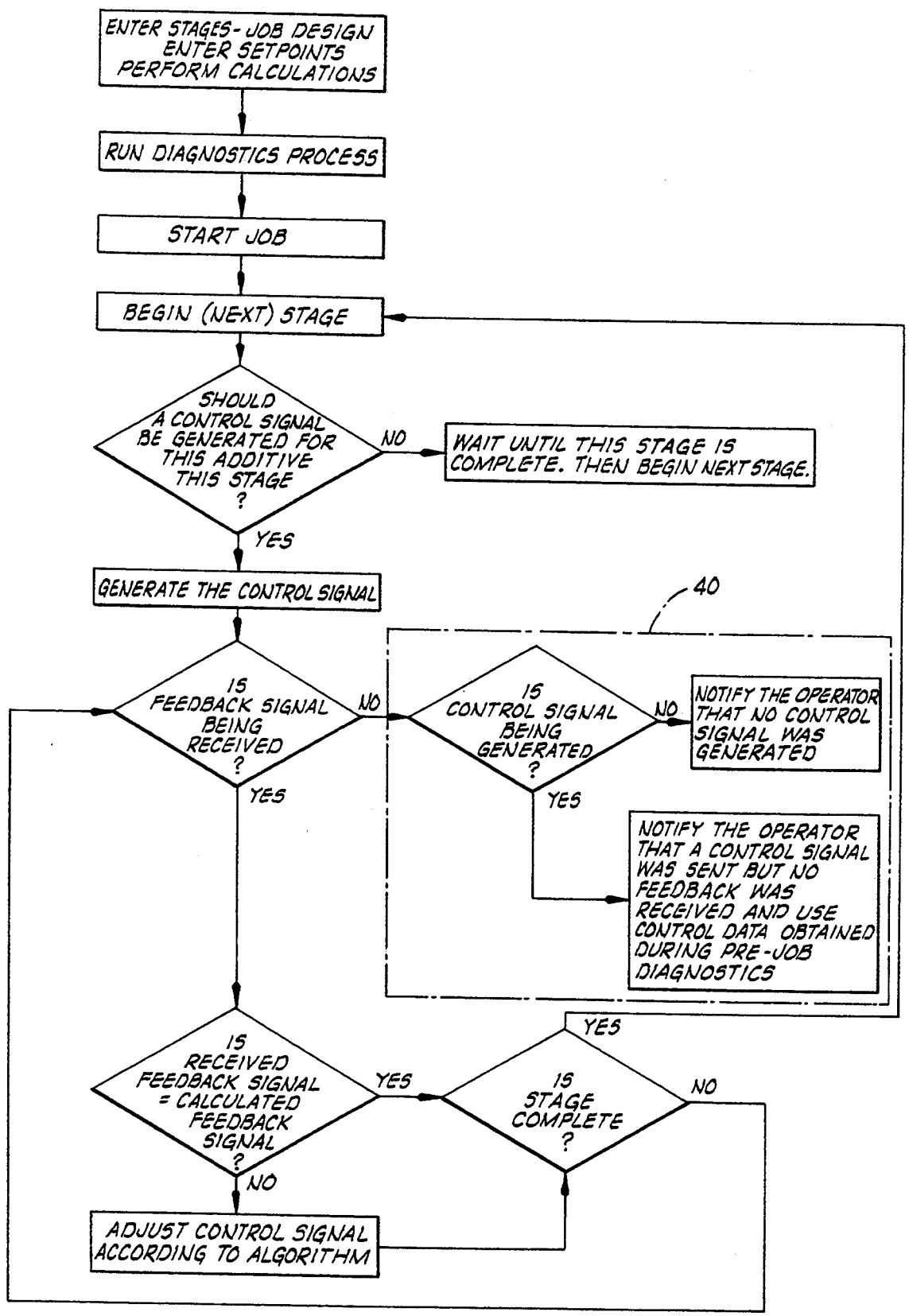
FIG. 4 is a flow chart for a computer program for implementing the present invention.
Figure 5:
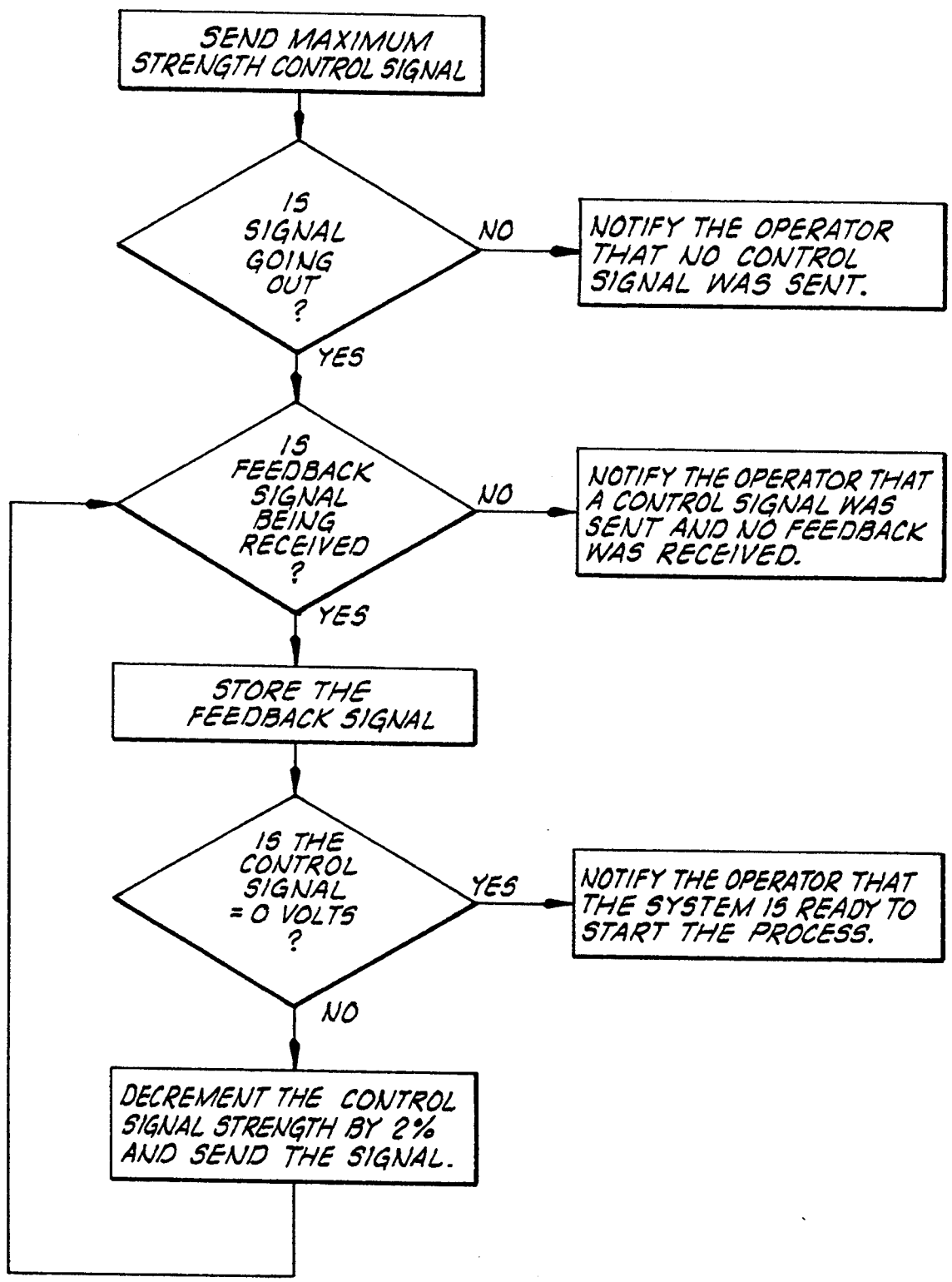
FIG. 5 is a flow chart for a computer program for implementing a pre-job diagnostic process forming part of the present invention.

Referring to FIG. 4, changes to the programming of the microcomputer 28 include those indicated by the reference numeral 40. Rather than assuming a zero feedback signal when no feedback signal from the sensor 14 is being received by the microcomputer 28, the present invention causes the microcomputer 28 to determine whether a valid control signal is being generated and to adjust the control to the proportional valve 8 in response to that determination. The determination as to the control signal is done by checking the input(s) provided to the microcomputer 28 by the comparators 34, 36.

As shown in FIG. 4, if no control signal is being generated so that it is provided to the proportional valve 8 and sensed within the range of the comparators 34, 36, a visible or audible indication is generated by the microcomputer 28 to notify an operator of this condition. The operator should then manually control the screw conveyor 6 in a known manner (or other apparatus that is being controlled in other applications of the present invention).

If a control signal is being so generated, a notification of this condition is also given to the operator as indicated in FIG. 4, and the microcomputer 28 is also programmed in accordance with the preferred embodiment of the present invention to commence modified automatic control of the screw conveyor 6 (or other device). In the preferred embodiment, the modified automatic control includes providing automatic open loop control to the screw conveyor 6. To provide this, the microcomputer 28 generates a fault-condition control signal in response to a predetermined data base stored in the microcomputer 28. The predetermined data base of the preferred embodiment is defined in response to control signal-feedback signal relationships that have been predetermined by running a pre-job (i.e., prior to commencing ultimate operational control of the screw conveyor 6) diagnostic program added to the microcomputer 28 in accordance with the preferred embodiment of the present invention. As will be more fully explained hereinbelow, through use of the diagnostic program various test feedback signals are determined in response to various test control signals. From this information, when the microcomputer 28 is to generate a fault-condition control signal, such signal corresponds to the test control signal that caused a selected respective test feedback signal to be detected, which test feedback signal is preferably selected so that it corresponds to the then current set point to which the microcomputer 28 was trying to control the screw conveyor 6 prior to when the microcomputer 28 detected that no actual feedback signal was being received.

The pre-job diagnostic programming of the microcomputer 28 causes it to test the response of the apparatus being controlled prior to the desired operation commencing. This testing includes providing predetermined test control signals to the apparatus (specifically, to the proportional valve 8 in the illustrated embodiment), detecting responsive test feedback signals (specifically, from the sensor 14 in the illustrated embodiment) and storing data for later identifying respective test feedback signals with the predetermined test control signals.

Referring to FIG. 5, determining test feedback signals in accordance with the preferred embodiment includes: providing a maximum test control signal from the microcomputer 28 to the proportional valve 8; receiving and storing in the microcomputer 28 a first test feedback signal from the sensor 14 in response to the maximum test control signal; providing a reduced test control signal from the microcomputer 28 to the proportional valve 8; receiving and storing in the microcomputer 28 a second test feedback signal from the sensor 14 in response to the reduced feedback signal; and repeating the last two mentioned steps of providing a reduced test control signal and receiving and storing a responsive test feedback signal in the microcomputer 28 for further reduced test control signals and further test feedback signals until a minimum test control signal is provided. As shown in FIG. 5, the test control signal is reduced by 2% each iteration until a minimum test control signal of zero volts is provided. At the beginning of this process, the microcomputer 28 checks to make sure the first, maximum test control signal has been validly generated; and during each iteration, the microcomputer 28 checks to make sure the feedback signal is being received. It is to be recalled that this process is preferably performed before the ultimately desired operation of the apparatus begins. Once this pre-job process is completed (i.e., when the minimum test control signal is generated), notification is given so that the main process can be started.

As a summary of the foregoing, the present invention provides, preferably through the microcomputer 28 (programmed in accordance with the present invention) and the control signal feedback means 32, an apparatus for controlling a device providing an output that is monitored through a sensor providing a feedback signal. This apparatus comprises: means for generating a control signal for the device in response to a set point and the feedback signal; means for detecting whether the feedback signal is being provided; means for determining whether the control signal is being provided to the device; and means, responsive to the detecting means detecting that no feedback signal is being provided, for adjusting the control to the device depending on whether the control signal is being provided. The apparatus preferably further comprises means for detecting test feedback signals in response to test control signals, and the means for adjusting preferably includes means for generating a fault-condition control signal corresponding to the test control signal for one of the test feedback signals selected in response to the set point.

To summarize the method of the present invention as it specifically relates to controlling the above-described sand conveying apparatus for delivering proppant to a mixing tub, the method comprises: detecting when the microcomputer 28 is not receiving a feedback signal from the sensor 14; in response to the foregoing, determining, via the control signal feedback means 32 and the microcomputer 28, whether a control signal is being provided to the proportional valve 8; and adjusting the control to the proportional valve 8 depending on whether the control signal is being provided. As to this last step: in response to determining that no control signal is being provided to the proportional valve 8, the method includes providing an indication so that an operator will know that no control signal is being provided and preferably commence manual control of the screw conveyor 6; and in response to determining that the control signal is being provided to the proportional valve 8, the method includes providing automatic open loop control to the screw conveyor 6. As explained above, this preferably includes generating a fault-condition control signal for the proportional valve 8 in response to a data base preferably predetermined by running a pre-job diagnostic program in the microcomputer 28 used in implementing the method in the particularly described environment.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. A method of controlling an apparatus with a control signal responsive to a feedback signal, comprising:
    detecting when a feedback signal is not being received;
    determining whether a control signal is being provided;
    adjusting the control to the apparatus depending on whether the control signal is being provided;
    testing the response of the apparatus, including providing predetermined test control signals to the apparatus and detecting responsive test feedback signals, wherein testing the response of the apparatus is performed by running a diagnostic program in a computer connected for controlling the apparatus and for storing data for later identifying respective test feedback signals with the predetermined test control signals; and
    wherein adjusting the control to the apparatus includes generating a fault-condition control signal corresponding to the test control signal that caused a selected respective test feedback signal to be detected.

2. A method as defined in claim 1, wherein determining whether a control signal is being provided includes comparing the control signal to predetermined maximum and minimum reference signals.

3. A method of controlling an apparatus for delivering proppant to a mixing tub, which apparatus includes a proportional valve controlling a pump driving a motor moving a proppant delivery mechanism, which proportional valve is responsive to a control signal from a computer and which computer is responsive at least in part to a feedback signal from a sensor detecting a speed associated with the driving of the motor by the pump, said method comprising:
    (a) detecting when the computer is not receiving a feedback signal from the sensor;
    (b) in response to step (a), determining whether a control signal is being provided to the proportional valve;
    (c) in response to determining that no control signal is being provided to the proportional valve, providing an indication so that an operator can know that no control signal is being provided;
    (d) in response to determining that the control signal is being provided to the proportional valve, generating a fault-condition control signal in response to a predetermined data base in the computer; and
    prior to step (a), defining the predetermined data base in the computer, including determining test feedback signals generated by the sensor in response to test control signals provided by the computer to the proportional valve, wherein determining test feedback signals includes:
    providing a maximum test control signal from the computer to the proportional valve;
    receiving and storing in the computer a first test feedback signal from the sensor in response to the maximum test control signal;
    providing a reduced test control signal from the computer to the proportional valve;
    receiving and storing in the computer a second test feedback signal from the sensor in response to the reduced feedback signal; and
    repeating the last two mentioned steps of providing a reduced test control signal and receiving and storing in the computer for further reduced test control signals and further test feedback signals until a minimum test control signal is provided.

4. A method as defined in claim 3, wherein step (b) includes sensing in the computer whether the control signal is within a predetermined operating range.

5. A method as defined in claim 4, wherein sensing in the computer whether the control signal is within a predetermined operating range includes comparing the control signal to an upper limit reference voltage and comparing the control signal to a lower limit reference voltage.

6. A method as defined in claim 3, wherein in step (d) the fault-condition control signal generated corresponds to the test control signal for the respective stored test feedback signal that corresponds to a set point then most recently used in the computer prior to step (a) for controlling the proportional valve.

* * * * *